United States Patent
Suzuki

(10) Patent No.: US 10,622,874 B2
(45) Date of Patent: Apr. 14, 2020

(54) FAN APPARATUS AND MANUFACTURING METHOD OF THE FAN APPARATUS

(71) Applicant: MINEBEA MITSUMI INC., Nagano (JP)

(72) Inventor: Tomoyuki Suzuki, Kakegawa (JP)

(73) Assignee: MINEBEA MITSUMI INC., Nagano (JP)

( * ) Notice: Subject to any disclaimer, the term of this patent is extended or adjusted under 35 U.S.C. 154(b) by 473 days.

(21) Appl. No.: 15/400,305

(22) Filed: Jan. 6, 2017

(65) Prior Publication Data
US 2017/0207689 A1    Jul. 20, 2017

(30) Foreign Application Priority Data
Jan. 15, 2016 (JP) ................................ 2016-006160

(51) Int. Cl.
*H02K 15/16* (2006.01)
*F04D 29/66* (2006.01)
(Continued)

(52) U.S. Cl.
CPC ....... *H02K 15/165* (2013.01); *F04D 25/0613* (2013.01); *F04D 29/053* (2013.01); *F04D 29/329* (2013.01); *F04D 29/522* (2013.01); *F04D 29/542* (2013.01); *F04D 29/646* (2013.01); *F04D 29/662* (2013.01); *H02K 5/225* (2013.01); *H02K 7/04* (2013.01); *H02K 7/14* (2013.01); *H02K 21/22* (2013.01)

(58) Field of Classification Search
CPC ............ H02K 5/15; H02K 5/163; H02K 5/20; H02K 5/22; H02K 5/225; H02K 7/14
USPC .............................................. 310/66, 89, 99
See application file for complete search history.

(56) References Cited

U.S. PATENT DOCUMENTS 8,109,713 B2 *  2/2012  Horng ................. F04D 25/0613
                                                               165/121
2007/0063600 A1 *  3/2007  Fujii ...................... H02K 5/225
                                                                 310/71

(Continued)

FOREIGN PATENT DOCUMENTS

CN           2457384 Y      10/2001
CN          101900126 A     12/2010

(Continued)

OTHER PUBLICATIONS

Patent Translate Description JPH02245500 (Year: 2019).*

(Continued)

*Primary Examiner* — Nguyen Tran
(74) *Attorney, Agent, or Firm* — Pearne & Gordon LLP

(57) ABSTRACT

A fan apparatus comprises a stator unit, a rotor unit comprising an impeller, and a casing that houses the stator unit and the rotor unit. The casing comprise a side wall portion that surrounds a periphery of the impeller, a base portion that holds the stator unit and the rotor unit, and a plurality of connection portions that connect the side wall portion and the base portion. The casing is formed by at least two members including a first member and a second member coupled to the first member. The first member includes at least one of the connection portions and at least part of the base portion, and the second member includes at least one of the connection portions.

13 Claims, 10 Drawing Sheets

(51) Int. Cl.
- *F04D 29/54* (2006.01)
- *F04D 29/64* (2006.01)
- *H02K 21/22* (2006.01)
- *F04D 25/06* (2006.01)
- *H02K 7/04* (2006.01)
- *F04D 29/053* (2006.01)
- *F04D 29/32* (2006.01)
- *F04D 29/52* (2006.01)
- *H02K 5/22* (2006.01)
- *H02K 7/14* (2006.01)

(56) References Cited

U.S. PATENT DOCUMENTS

| | | | |
|---|---|---|---|
| 2007/0099459 A1* | 5/2007 | Otsuki | F04D 25/0613 439/144 |
| 2013/0004348 A1 | 1/2013 | Sugiyama et al. | |
| 2015/0030481 A1 | 1/2015 | Sugiyama et al. | |
| 2016/0169242 A1 | 6/2016 | Sugiyama et al. | |

FOREIGN PATENT DOCUMENTS

| | | |
|---|---|---|
| CN | 102852968 A | 1/2013 |
| CN | 203374496 U | 1/2014 |
| JP | 02-245500 A | 10/1990 |
| JP | 2000-352397 A | 12/2000 |
| JP | 2010-025087 A | 2/2010 |
| JP | 2013-061063 A | 4/2013 |

OTHER PUBLICATIONS

Chinese Office Action dated Aug. 3, 2018 for corresponding Chinese Application No. 201710028617.8 and English translation.
Japanese Office Action dated Feb. 20, 2018 for corresponding to Japanese Application No. 2016-006160 and English translation.

* cited by examiner

FAN APPARATUS AND MANUFACTURING METHOD OF THE FAN APPARATUS

CROSS REFERENCE TO RELATED APPLICATIONS

This application claims the benefit of Japanese Patent Application No. 2016-006160, filed Jan. 15, 2016, which is hereby incorporated by reference in its entirety.

BACKGROUND

Technical Field

The present disclosure is related to a fan apparatus and a manufacturing method of the fan apparatus.

Background

In a general blower (fan apparatus), a rotating body (hereinafter called a "rotor unit") including an impeller, a yoke, a magnet, and a shaft is dynamically unbalanced due to a product error, a processing error, an assembly error or the like of the rotor unit.

Therefore, a balance weight (balance adjustment weight) is attached to the rotor unit in the fan apparatus to remove the dynamic unbalance of the rotor unit (see Japanese Unexamined Patent Application Publication No. 2013-061063).

For example, the balance adjustment is performed by attaching the balance weight (balance adjustment weight) to remove the dynamic unbalance of the rotor unit before the rotor unit is attached to the fan apparatus after the rotor unit is manufactured (see Japanese Unexamined Patent Application Nos. 2010-025087 and 2000-352397).

However, an assembly error or the like also occurs during the assembly of the fan apparatus. Therefore, even if the balance adjustment is performed to remove the dynamic unbalance in the state in which the rotor unit is not installed, dynamic unbalance occurs in the rotor unit again after the rotor unit is assembled, depending on the assembly state of the fan apparatus.

Therefore, it may be preferable to perform the balance adjustment of the rotor unit after the rotor unit is assembled to the fan apparatus.

It is preferable to perform the balance adjustment of the rotor unit after the rotor unit is attached to the fan apparatus on both surfaces of an opening edge portion of a cup-shaped hub portion opening toward an upper surface of the impeller and toward a base portion.

However, a casing of the fan apparatus is provided with connection portions, such as stator blades (also called fixed blades) and spokes for connecting the base portion, which holds the rotor unit and a stator unit, and a side wall portion surrounding a periphery of the impeller provided on the rotor unit.

Therefore, in a small fan apparatus or the like, the connection portions and the like of the casing become an obstacle after the rotor unit is attached to the fan apparatus. There is a problem such that it is difficult to perform balance adjustment work at the opening edge portion of the hub portion of the rotor unit.

The present disclosure is related to providing a fan apparatus and a manufacturing method of the fan apparatus that prevent connection portions or the like of a casing from becoming an obstacle in balance adjustment of a rotor unit.

SUMMARY

In accordance with one aspect of the present disclosure, (1) a fan apparatus comprising: a stator unit; a rotor unit comprising an impeller; and a casing that houses the stator unit and the rotor unit, wherein the casing comprises a side wall portion that surrounds a periphery of the impeller, a base portion that holds the stator unit and the rotor unit, and a plurality of connection portions that connect the side wall portion and the base portion, the casing is formed by at least two members including a first member and a second member coupled to the first member, the first member includes at least one of the connection portions and at least part of the base portion, and the second member includes at least one of the connection portions.

(2) In the fan apparatus, the second member includes at least either part of the side wall portion or part of the base portion.

(3) In the configuration according to (2), the second member includes at least part of the side wall portion.

(4) In the configuration according to any one of (1) to (3), the rotor unit includes an adjustment region, on a side close to the connection portions, in which balance adjustment can be performed.

(5) In the configuration according to (4), the balance adjustment is performed by attaching a balance weight to the adjustment region.

(6) In the configuration according to (5), the rotor unit includes: a shaft; the impeller including a cup-shaped hub portion opening toward the base portion attached to the shaft and a plurality of blades on a periphery of the hub portion; a yoke provided on an inner peripheral surface of the hub portion; and a magnet provided on the yoke, and the rotor unit includes, as the adjustment region, a recess portion for attaching the balance weight provided along an opening edge portion of the hub portion.

(7) In the configuration according to (6), an outer diameter of the opening edge portion of the hub portion is substantially the same as an outer diameter of an end portion of the base portion closer to the hub portion.

(8) In the configuration according to any one of (1) to (7), the connection portion of the second member is provided with a support portion that supports lead wires on a side close to the impeller, the lead wires being drawn out from a circuit board provided between the stator unit and the base portion.

(9) In the configuration according to (8), the side wall portion includes a lead wire draw-out port for drawing out the lead wires to outside of the casing, and the support portion is configured to guide the lead wires to the lead wire draw-out port.

(10) In the configuration according to (8) or (9), the base portion is provided with a lead wire removal portion for drawing out the lead wires toward the side wall portion, and the connection portion of the second member is the connection portion adjacent to the lead wire removal portion.

(11) In the configuration according to (3), the side wall portion includes a lead wire draw-out port for drawing out lead wires to outside of the casing, the lead wires being drawn out from a circuit board provided between the stator unit and the base portion, said lead wire draw-out port being formed by coupling the first member and the second member.

(12) In the configuration according to any one of (1) to (11), a coupling point of the first member and the second member includes a coupling structure selected from a fitting structure in a stepped shape and an engaging structure engaged by an engaging hook.

(13) In the configuration according to any one of (1) to (12), the second member is coupled to the first member in a direction intersecting a flow of gas generated by the impeller.

(14) In a manufacturing method of the fan apparatus with the configuration according to any one of (1) to (13), when balance adjustment is necessary, the rotor unit is accessed from an open region provided with the second member to adjust the balance of the rotor unit before the second member is coupled to the first member in a state in which the rotor unit and the stator unit are held by the base portion.

The present disclosure can provide a fan apparatus and a manufacturing method of the fan apparatus that prevent connection portions or the like of a casing from becoming an obstacle in balance adjustment of a rotor unit.

DETAILED DESCRIPTION

A mode (hereinafter called an "embodiment") for carrying out the present disclosure will now be described in detail with reference to the attached drawings.

Note that the same reference signs are provided to the same elements throughout the entire description of the embodiment.

Figure 1:
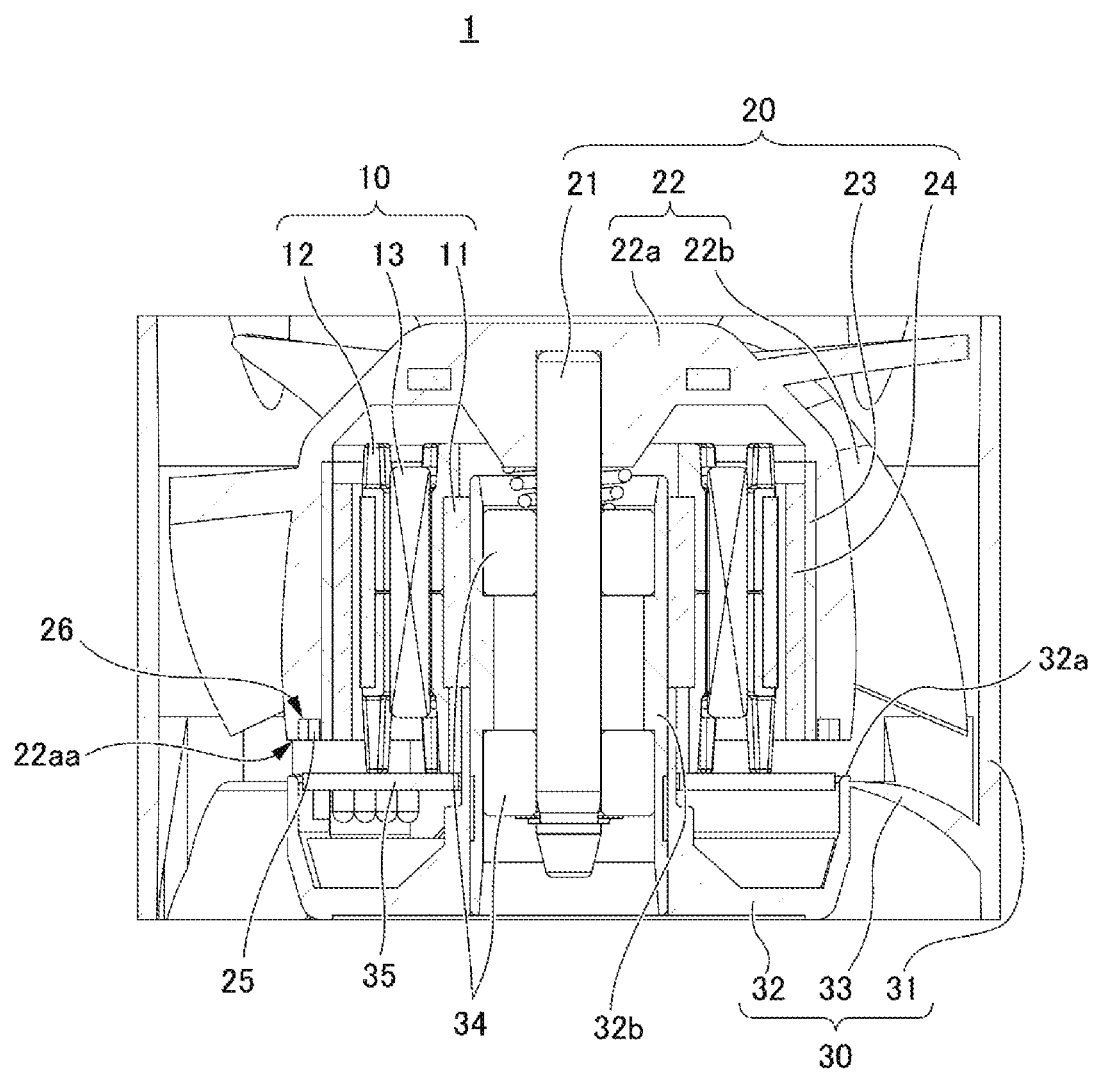
FIG. 1 is a cross-sectional view of a fan apparatus of an embodiment according to the present disclosure.

FIG. 1 is a cross-sectional view of a fan apparatus 1 of the embodiment according to the present disclosure.

As shown in FIG. 1, the fan apparatus 1 includes: a stator unit 10; a rotor unit 20 including an impeller 22; and a casing 30 housing the stator unit 10 and the rotor unit 20.

(Stator Unit)

The stator unit 10 includes: a stator core 11 attached to a bearing housing 32b; an insulator 12 provided on the stator core 11; and a coil 13 wound on the stator core 11 through the insulator 12.

(Rotor Unit)

The rotor unit 20 includes: a shaft 21 as a rotation axis; the impeller 22 including a hub portion 22a attached to the shaft 21 and a plurality of blades 22b on a periphery of the hub portion 22a; a yoke 23 provided on an inner peripheral surface of the hub portion 22a; and a magnet 24 provided on the yoke 23.

Note that the method of attaching the hub portion 22a to the shaft 21 is not particularly limited. In the present embodiment, the impeller 22 is integrally molded to the shaft 21 by insert molding, and the hub portion 22a is attached such that the hub portion 22a is integrated with the shaft 21.

However, the impeller 22 provided with the hub portion 22a including a hole or a recess portion for inserting the shaft 21 may be created as a separate component, and the shaft 21 may be pressed or bonded into the hole or the recess portion to attach the hub portion 22a to the shaft 21.

The hub portion 22a has a cup shape opening toward a base portion 32 of the casing 30. A recess portion 26 for attaching a balance weight 25 provided along an opening edge portion 22aa of the hub portion 22a is provided on the rotor unit 20.

Therefore, the rotor unit 20 of the present embodiment includes, on the side close to connection portions 33 of the casing 30, the recess portion 26 (example of adjustment region) that allows performance of balance adjustment based on the balance weight 25. The balance weight 25 is attached to the recess portion 26 to perform the balance adjustment of the rotor unit 20.

Note that a step is formed inside of the opening edge portion 22aa of the hub portion 22a, and the yoke 23 is provided as a side wall of the inside of the step to form the recess portion 26 for attaching the balance weight 25 in the present embodiment. However, the recess portion 26 may be formed on the opening edge portion 22aa itself of the hub portion 22a.

Although the present embodiment illustrates a case of positive balance adjustment in which the balance weight 25 is provided, the balance adjustment is not limited to the positive balance adjustment. The balance adjustment may be negative balance adjustment, in which the opening edge portion 22aa itself of the hub portion 22a of the rotor unit 20 is set as an adjustment region for performing balance adjustment, and the opening edge portion 22aa is scraped to perform the balance adjustment.

However, although the manner of the balance adjustment will be described later, if the work of the scraping part of the rotor unit 20 is performed in a state in which the stator unit 10 and the rotor unit 20 are attached in the fan apparatus 1 as in the present embodiment, scraped debris generated by the scraping part may enter a gap or the like between the rotor unit 20 and the stator unit 10.

This causes a malfunction such as inhibited smooth rotation of the rotor unit 20. Therefore, when the generation of the scraped debris is predicted, it is preferable to perform positive balance adjustment that does not generate the scraped debris.

As shown in FIG. 1, an outer diameter of the opening edge portion 22aa of the hub portion 22a is substantially the same as an outer diameter of an end portion 32a of the base portion 32 of the casing 30 closer to the hub portion 22a.

If the outer diameter of the opening edge portion 22aa of the hub portion 22a is smaller than the outer diameter of the end portion 32a of the base portion 32 of the casing 30, the base portion 32 of the casing 30 protrudes. Therefore, when the rotor unit 20 rotates, and air sucked from an upper side of FIG. 1 flows toward a lower side of FIG. 1, the flow of the air is inhibited by the protrusion of the base portion 32.

On the other hand, if the outer diameter of the opening edge portion 22aa of the hub portion 22a is larger than the outer diameter of the end portion 32a of the base portion 32 of the casing 30, the gap between a side wall portion 31 of the casing 30 and the opening edge portion 22aa becomes narrow. Not only the flow of the air is inhibited, but also small blades 22b must be designed. Therefore, it is difficult to obtain a favorable flow of air.

Considering the above, it is preferable that the outer diameter of the opening edge portion 22aa of the hub portion 22a be substantially the same as the outer diameter of the end portion 32a of the base portion 32 of the casing 30 closer to the hub portion 22a.

(Casing)

The casing 30 includes: the side wall portion 31 surrounding a periphery of the impeller 22; the base portion 32; and the connection portions 33 including a plurality of stator blades connecting the side wall portion 31 and the base portion 32.

Note that the connection portions 33 are not limited to the stator blades, and the connection portions 33 may be spokes or the like.

The bearing housing 32b is provided on the base portion 32, and the stator unit 10 and the rotor unit 20 are provided on the bearing housing 32b.

Therefore, the base portion 32 is a part holding the stator unit 10 and the rotor unit 20 through the bearing housing 32b.

Although the bearing housing 32b is a separate component and is attached to the base portion 32 in the present embodiment, the bearing housing 32b may be integrally molded to the base portion 32.

Although the present embodiment illustrates a case in which the stator unit 10 is provided on the bearing housing 32b, the stator unit 10 may be directly held by the base portion 32, instead of through the bearing housing 32b.

On the bearing housing 32b, rolling bearings 34 are provided on one end side (upper side of FIG. 1) and another end side (lower side of FIG. 1) in the bearing housing 32b. The rolling bearings 34 support the shaft 21 of the rotor unit 20 in a manner such that the shaft 21 can rotate, and the rotor unit 20 can rotate relative to the stator unit 10.

A circuit board 35 that controls the drive of the fan apparatus 1 is provided on the base portion 32.

Note that the location of the installation of the circuit board 35 is not limited to the base portion 32, and the circuit board 35 may be provided closer to the stator core 11 of the stator unit 10. It is only necessary that the circuit board 35 be provided between the stator unit 10 and the base portion 32.

Figure 2:
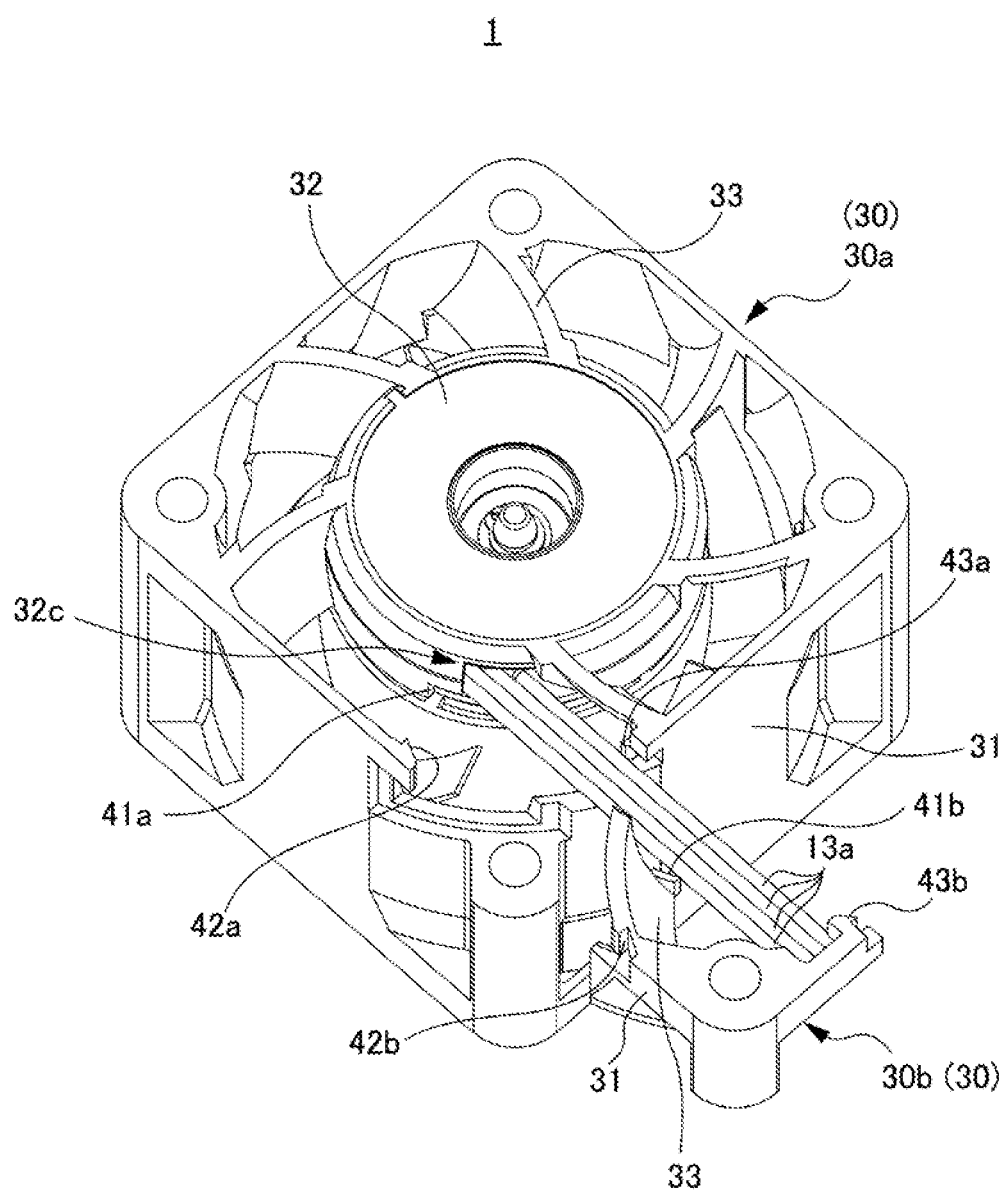
FIG. 2 is a perspective view of the fan apparatus as viewed in a direction in which a base portion and connection portions of a casing of the embodiment can be easily viewed.

FIG. 2 is a perspective view of the fan apparatus 1 as viewed in a direction in which the base portion 32 and the connection portion 33 of the casing 30 can be easily viewed.

As shown in FIG. 2, the casing 30 includes at least two members including a first member 30a and a second member 30b coupled to the first member 30a.

A notch is formed on part of a peripheral side wall of the base portion 32, and the base portion 32 is provided with a lead wire removal portion 32c for taking out lead wires 13a drawn out from the circuit board 35, toward the side wall portion 31 of the casing 30. The second member 30b includes: at least one connection portion 33 that is the connection portion 33 adjacent to the lead wire removal portion 32c; and at least part of the side wall portion 31.

The first member 30a includes the rest of the connection portions 33 of the casing 30, the rest of the side wall portion 31, and the base portion 32.

In the present embodiment, the first member 30a and the second member 30b are coupled at three points.

Specifically, a fitting recess portion 41a is provided on the base portion 32 of the first member 30a, and a fitting protrusion portion 41b fitted to the fitting recess portion 41a is provided on the connection portion 33 of the second member 30b. One engaging hook 42a and one engaging portion 43a are provided on parts of the side wall portion 31 of the first member 30a where the side wall portion 31 of the second member 30b is fitted. An engaging portion 42b is provided on a part of the second member 30b corresponding to the engaging hook 42a, and an engaging hook 43b is provided on a part of the second member 30b corresponding to the engaging portion 43a.

Therefore, the coupling points of the first member 30a and the second member 30b include coupling structures selected from a fitting structure in a stepped shape, such as the fitting recess portion 41a and the fitting protrusion portion 41b, and an engaging structure engaged by the engaging hook 42a and 43b.

It is only necessary that the coupling structures be selected from the fitting structure and the locking structure. Therefore, the coupling structures may include only the locking structures, for example.

The second member 30b is coupled to the first member 30a in a direction intersecting a flow of gas (hereinafter the flow of gas will be called "wind") generated by the impeller 22.

The second member 30b here includes the connection portion 33 made of the stator blade, and the stator blade receives the wind generated by the impeller 22.

However, since the second member 30b is coupled to the first member 30a in the direction intersecting the wind, the second member 30b does not come off of the first member 30a even when the connection portion 33, which is made of the stator blade, of the second member 30b receives the wind.

(Balance Adjustment)

A manufacturing method involving the balance adjustment of the fan apparatus 1 of the present embodiment configured as described above will be described.

Figure 3:
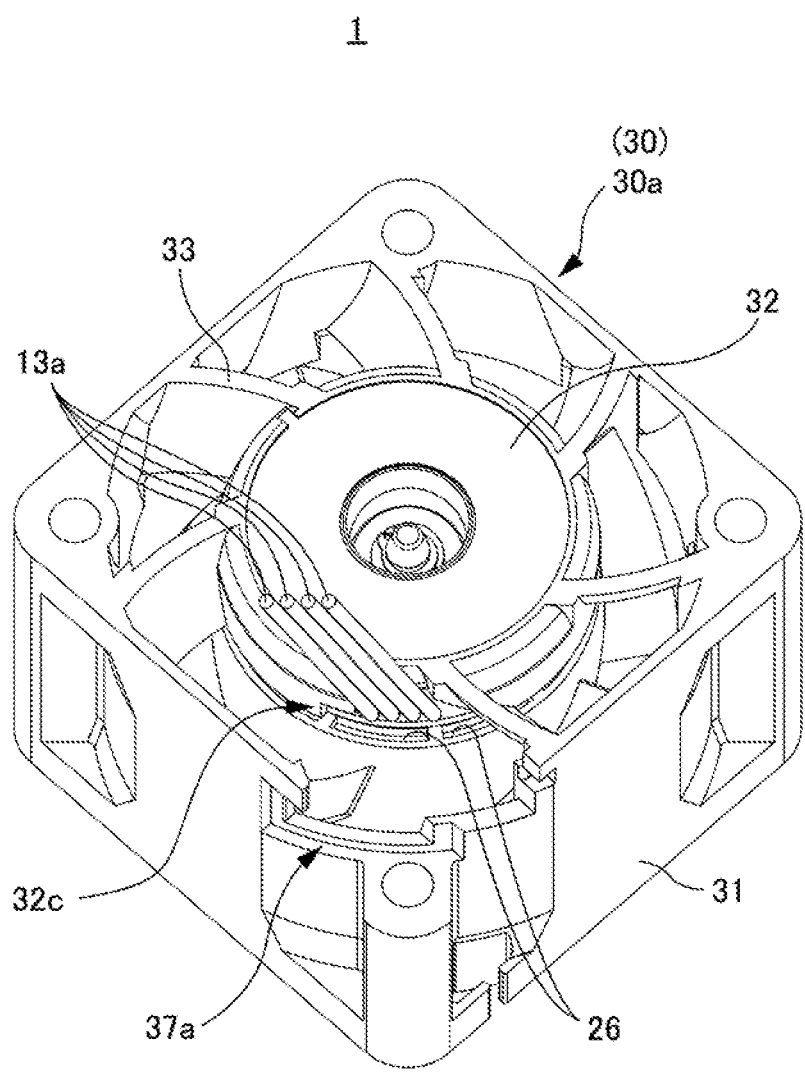
FIG. 3 is a perspective view showing a state in which a rotor unit and a stator unit of the embodiment are held by a base portion of a first member through a bearing housing.

FIG. 3 is a perspective view showing a state after the attachment of the stator unit 10 and the rotor unit 20 in the fan apparatus 1, i.e., a state in which the rotor unit 20 and the stator unit 10 are held by the base portion 32 of the first member 30a through the bearing housing 32b (see FIG. 1).

Note that FIG. 3 shows the fan apparatus 1 before the attachment of the second member 30b.

As can be recognized from FIG. 3, before the second member 30b is coupled to the first member 30a in this state, simply enabling removal of a small amount of the lead wires 13a drawn out from the circuit board 35 allows easy access to the recess portion 26 for attaching the balance weight 25 of the rotor unit 20 from an open region that is a location where the second member 30b is to be provided.

Therefore, in the state in which the rotor unit 20 and the stator unit 10 are held by the base portion 32 and before the second member 30b is coupled to the first member 30a, the balance adjustment of the rotor unit 20 is performed by accessing the rotor unit 20 from the location where the second member 30b is to be provided. The second member 30b is then coupled to the first member 30a to manufacture the fan apparatus 1.

The balance adjustment does not have to be performed when there is no dynamic unbalance in the rotor unit 20 in the state in which the stator unit 10 and the rotor unit 20 are held by the base portion 32. Therefore, note that the balance adjustment is carried out when the balance adjustment is necessary, and that the balance adjustment is not necessarily performed at all times.

Figure 4:
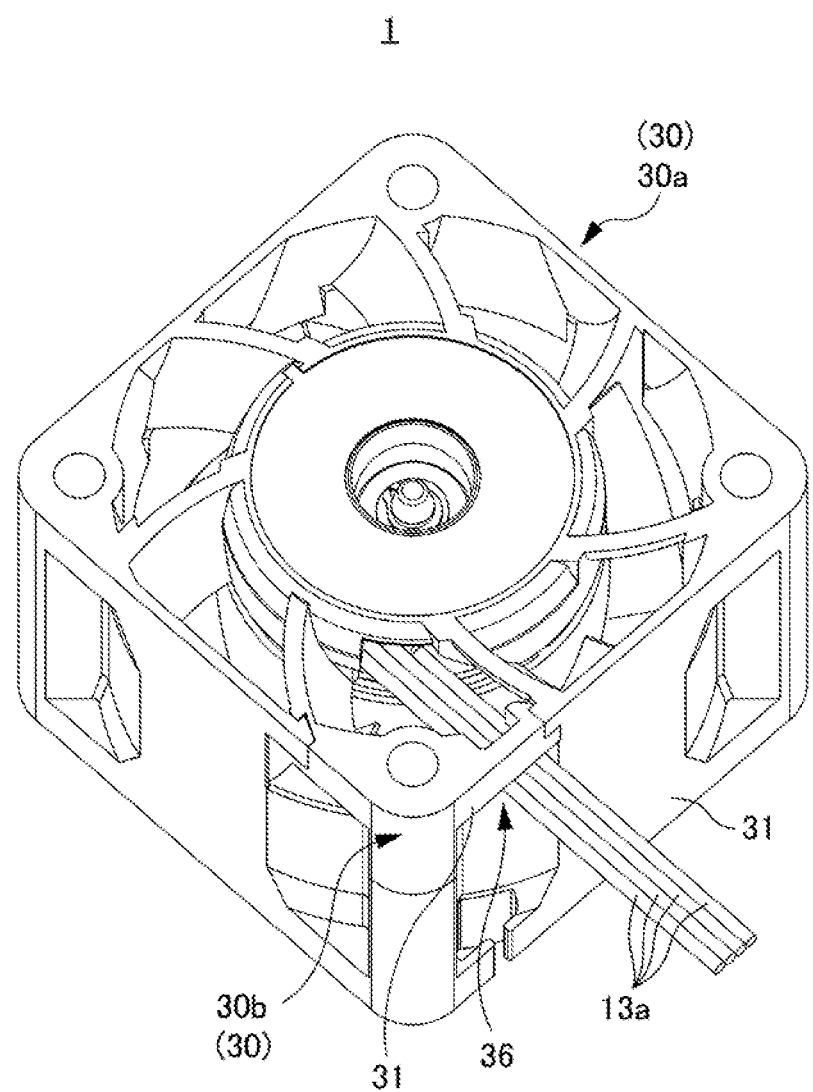
FIG. 4 is a perspective view of the fan apparatus showing a state in which a second member is coupled to the first member shown in FIG. 3.

FIG. 4 is a perspective view of the fan apparatus 1 showing a state in which the second member 30b is coupled to the first member 30a shown in FIG. 3.

In the present embodiment, a lead wire draw-out port 36 for drawing out, to the outside of the casing 30, the lead wires 13a drawn out from the circuit board 35 is formed on the side wall portion 31 of the casing 30 after the coupling of the first member 30a and the second member 30b.

Therefore, in coupling the second member 30b to the first member 30a after the end of the balance adjustment as described above, the lead wires 13a are positioned at the lead wire draw-out port 36 formed by the coupling, and then the second member 30b is coupled to the first member 30a.

In this way, in the fan apparatus 1 of the present embodiment, the balance adjustment of the rotor unit 20 can be performed by easily accessing the recess portion 26 for attaching the balance weight 25 of the rotor unit 20 from the open region that is the location where the second member 30b is to be provided, before the second member 30b is coupled to the first member 30a, even in the state after the rotor unit 20 is assembled in the fan apparatus 1. Therefore, the connection portions 33 and the like of the casing 30 do not become an obstacle in the balance adjustment of the rotor unit 20.

If there is a gap on the side wall portion 31 at the connection part of the first member 30a and the second member 30b, wind leaks from the gap.

Therefore, in the present embodiment, a step 37a is provided at a part provided with the second member 30b of the first member 30a as shown in FIG. 3.

Figure 5:
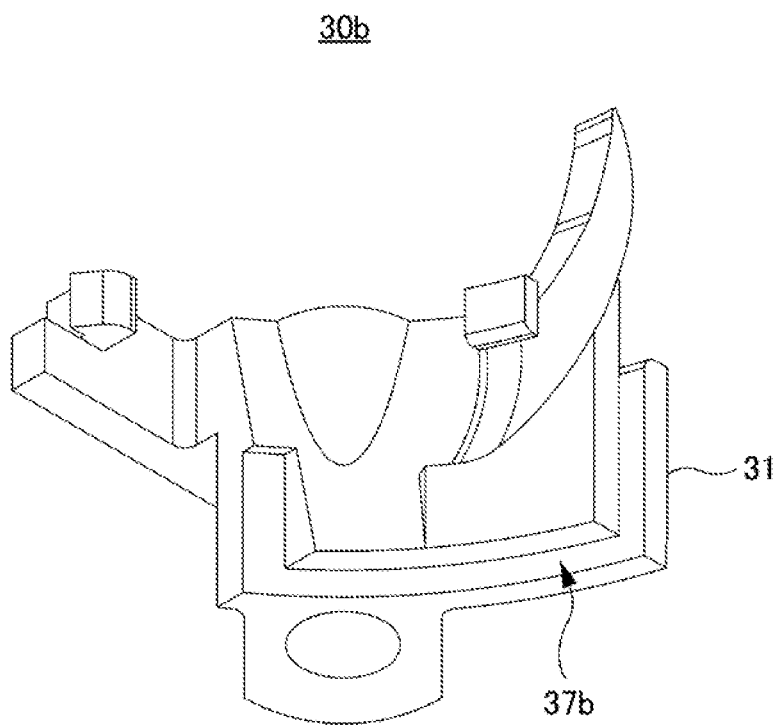
FIG. 5 is a perspective view of a part inside of a casing of the second member of the embodiment.

A step 37b put together with the step 37a provided on the first member 30a is also provided on the second member 30b as shown in FIG. 5 which is a perspective view of the part inside of the casing 30 of the second member 30b.

In this way, the step 37a and the step 37b overlap with each other when the second member 30b is coupled to the first member 30a, and formation of a gap on the side wall portion 31 can be prevented.

(Modifications of Second Member)

Figure 6B:
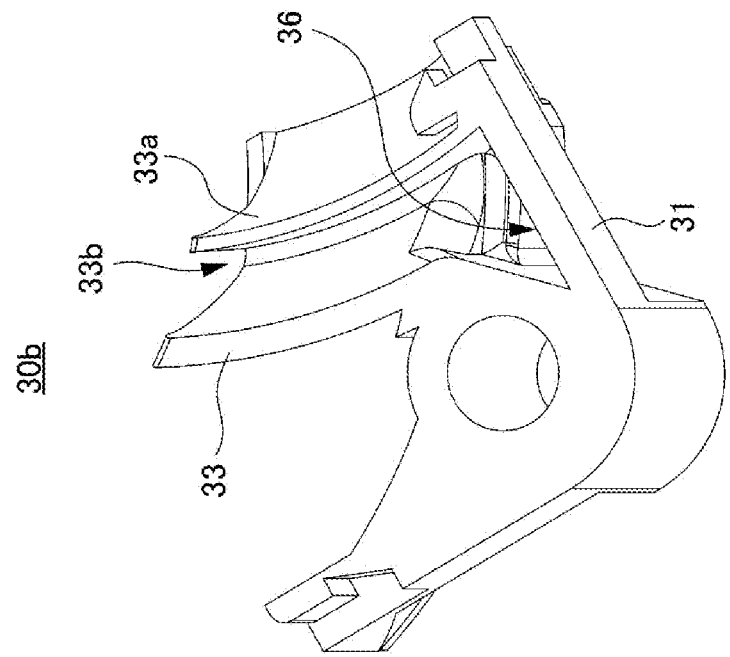
FIGS. 6A and 6B are diagrams showing modifications of the second member of the embodiment, FIG. 6A showing a perspective view illustrating a first modification of the second member, FIG. 6B showing a perspective view illustrating a second modification of the second member.
Figure 6A:
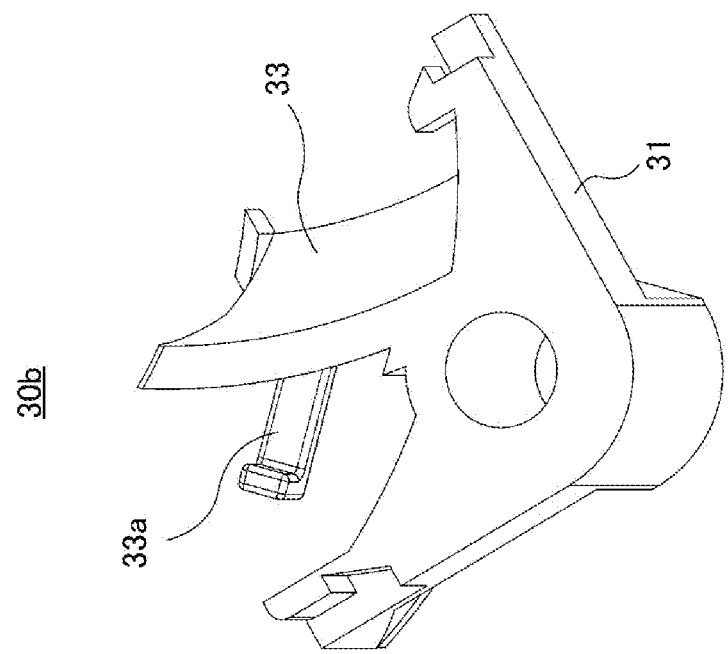

FIGS. 6A and 6B are diagrams showing modifications of the second member 30b. FIG. 6A is a perspective view showing a first modification of the second member 30b, and FIG. 6B is a perspective view showing a second modification of the second member 30b.

As shown in FIG. 6A, a support portion 33a for supporting the lead wires 13a (see FIG. 3) on the side close to the impeller 22 (blades 22b) is provided on the connection portion 33 of the second member 30b of the first modification.

The support portion 33a can be provided in this way to prevent part of the lead wires 13a from coming into contact with the blades 22b due to bending of the lead wires 13a.

In the second member 30b of the second modification of FIG. 6B, the support portion 33a provided on the connection portion 33 and the connection portion 33 form a guide portion 33b for guiding the lead wires 13a to the lead wire draw-out port 36.

In this way, the support portion 33a is configured to guide the lead wires 13a to the lead wire draw-out port 36, and the lead wires 13a can be surely led to the lead wire draw-out port 36.

Although the present disclosure has been described based on an embodiment, the present disclosure is not limited to this embodiment.

For example, the first member 30a and the second member 30b may be configured as shown in FIGS. 7 to 10.

(Modifications of Fan Apparatus)

Figure 7:
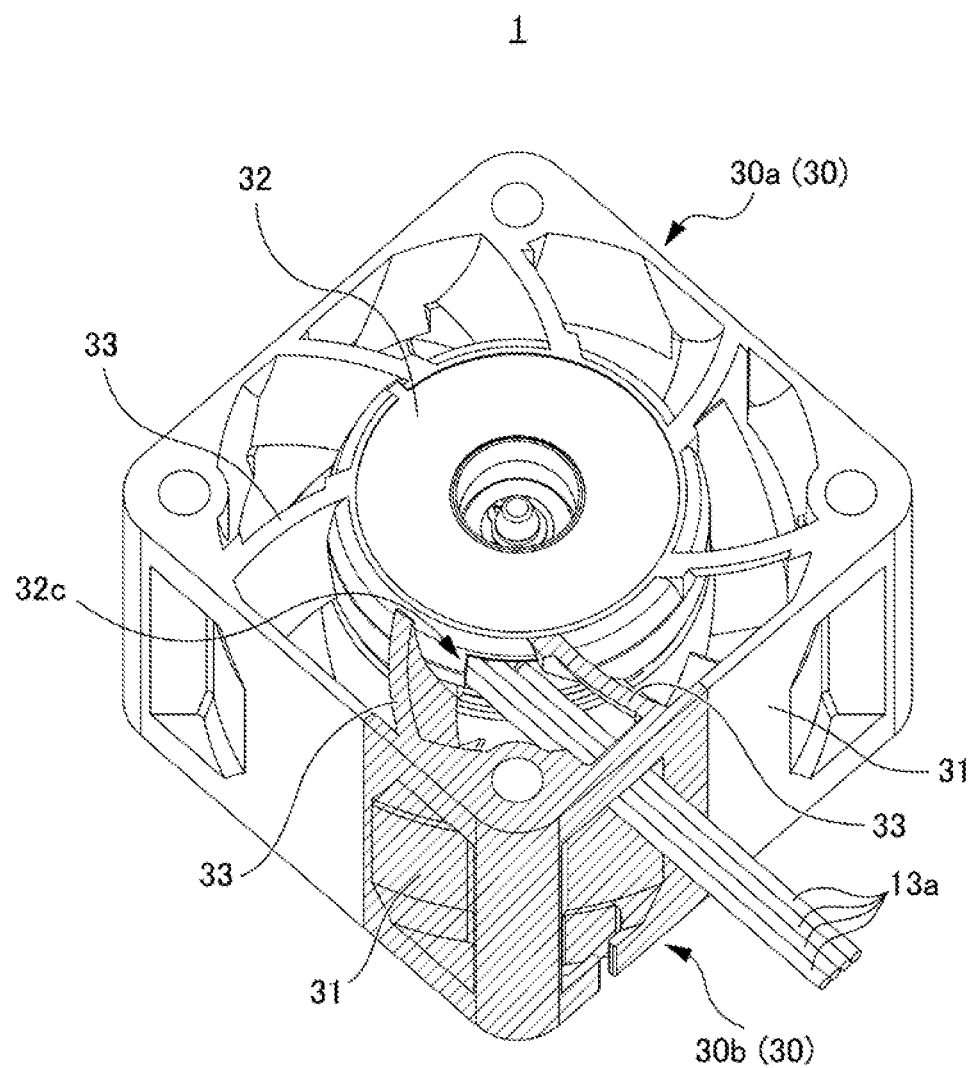
FIG. 7 is a perspective view illustrating a first modification of the fan apparatus of the embodiment according to the present disclosure.
Figure 8:
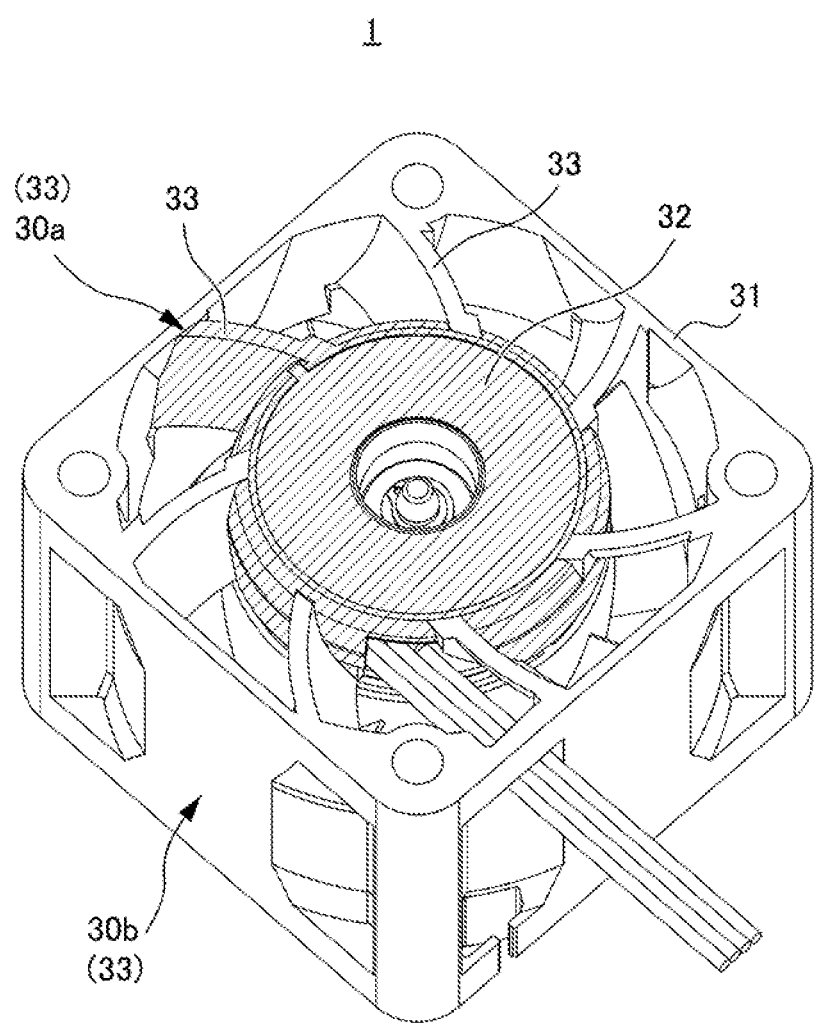
FIG. 8 is a perspective view illustrating a second modification of the fan apparatus of the embodiment according to the present disclosure.
Figure 9:
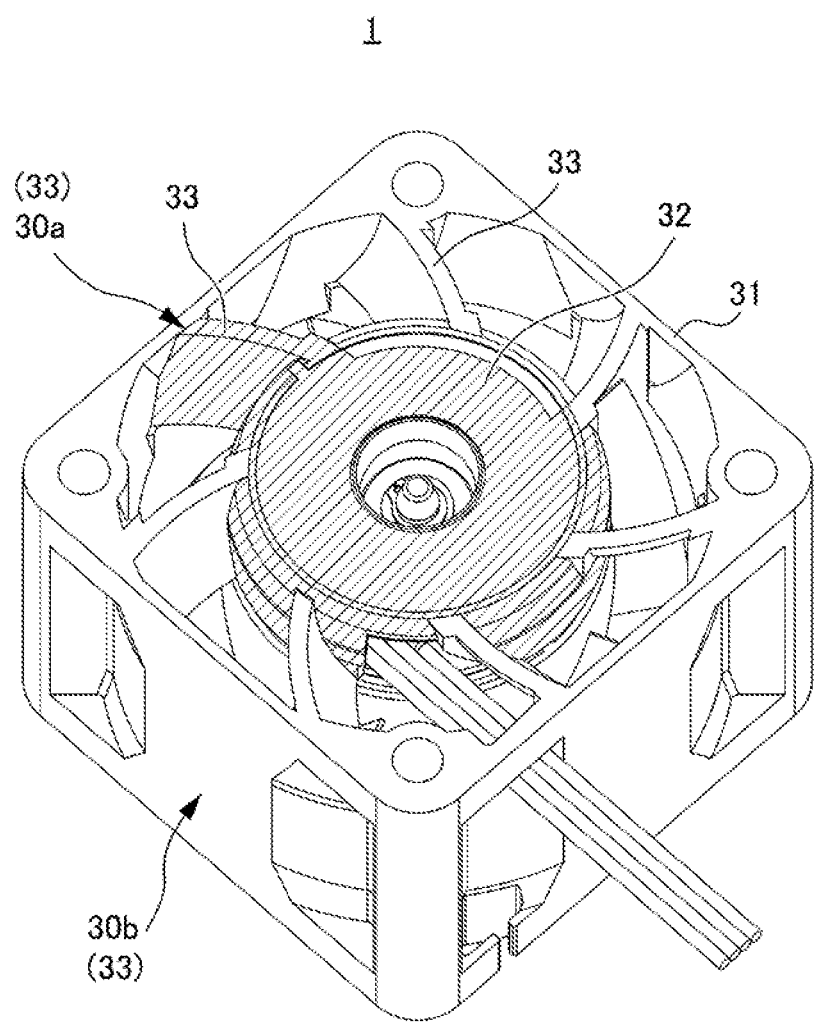
FIG. 9 is a perspective view illustrating a third modification of the fan apparatus of the embodiment according to the present disclosure.
Figure 10:
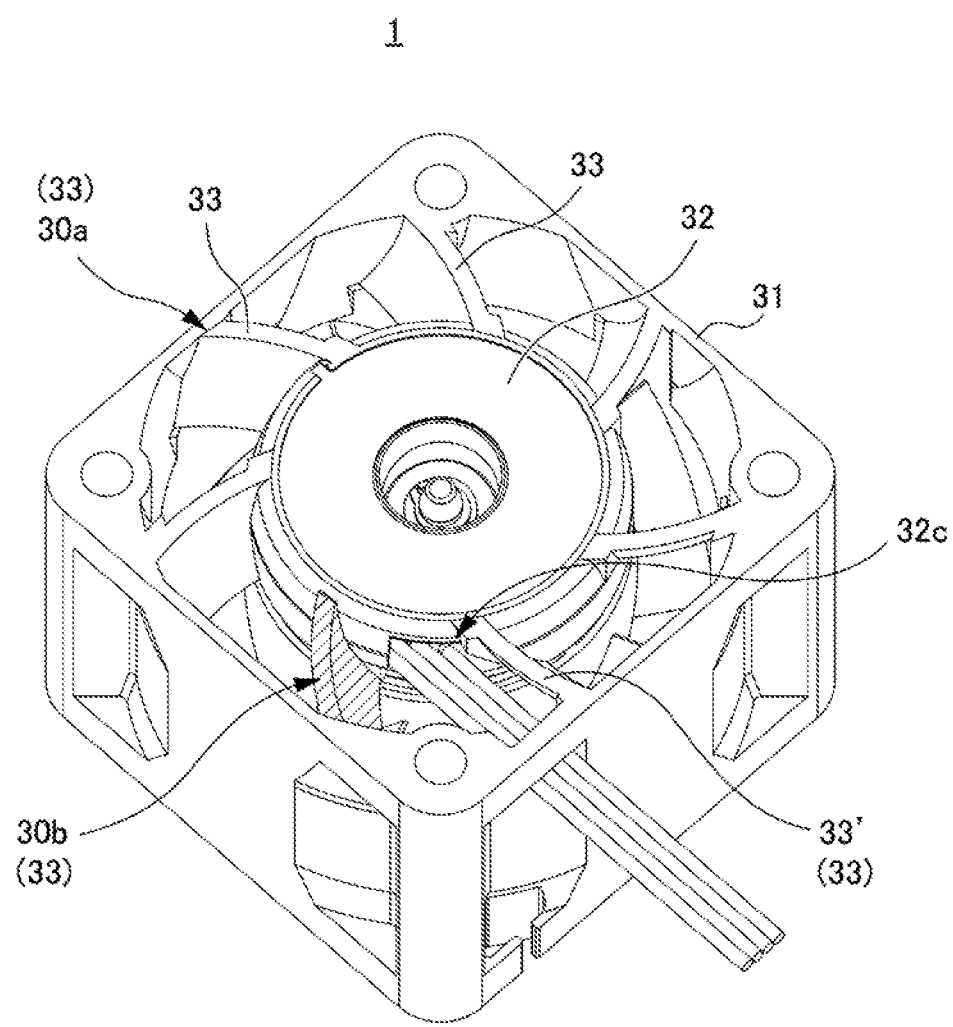
FIG. 10 is a perspective view illustrating a fourth modification of the fan apparatus of the embodiment according to the present disclosure.

FIG. 7 is a perspective view showing a first modification of the fan apparatus 1. FIG. 8 is a perspective view showing a second modification of the fan apparatus 1. FIG. 9 is a perspective view showing a third modification of the fan apparatus 1. FIG. 10 is a perspective view showing a fourth modification of the fan apparatus 1.

Note that the coupling structures (fitting structures or engaging structures) between the first member 30a and the second member 30b are not illustrated in FIGS. 7, 8, 9, and 10.

In the first modification of the fan apparatus 1 shown in FIG. 7, the second member 30b (see hatched part) includes two connection portions 33 adjacent to the lead wire removal portion 32c for taking out, toward the side wall portion 31 of the casing 30, the lead wires 13a drawn out from the circuit board 35.

The side wall portion 31 is cut in a length direction (a gas flow direction) at the part provided with the second member 30b, and the place of the side wall portion 31 of the part provided with the second member 30b is brought into an open state in the state before the second member 30b is coupled to the first member 30a.

In this way, the open region that is a location where the second member 30b is to be provided is further expanded, and the balance adjustment work can be more easily performed.

In the second modification of the fan apparatus 1 shown in FIG. 8, the first member 30a includes only one connection portion 33 (see hatched part) connected to the base portion 32, and the second member 30b includes the rest of the connection portions 33 and the entire side wall portion 31.

According to the configuration, the base portion 32 holding the stator unit 10 and the rotor unit 20 can be taken out and pulled out to the lower side of FIG. 8, and the balance adjustment work can be easily performed by taking out the base portion 32 in this way.

In the third modification of the fan apparatus 1 shown in FIG. 9, the first member 30a (see hatched part) does not include the entire part of the base portion 32, and both of the first member 30a and the second member 30b include part of the base portion 32.

Note that the second member 30b includes the connection portions 33, the side wall portion 31, and part of the base portion 32 in the third modification.

In this way, it is only necessary that the first member 30a include at least one connection portion 33 and at least part of the base portion 32. In this case, the base portion 32 holding the stator unit 10 and the rotor unit 20 can also be taken out and pulled out to the lower side of FIG. 9, and the balance adjustment work can be easily performed by taking out the base portion 32 in this way.

In the fourth modification of the fan apparatus 1 shown in FIG. 10, the second member 30b includes one connection portion 33 (see hatched part), and the first member 30a includes the rest of the connection portions 33, the side wall portion 31, and the base portion 32.

In this case, the open region that is a location where the second member 30*b* is to be provided is also expanded by removing the second member 30*b*, and the balance adjustment work can be easily performed.

Note that when the second member 30*b* is a connection portion as shown in FIG. 10, another connection portion 33' adjacent to the lead wire removal portion 32*c* may be a second member and may be able to be removed. In this way, the open region that is a location where the second members (two second members, i.e. see the second member 30*b* and the connection portion 33') are to be provided is further expanded, and the balance adjustment work can be more easily performed.

Therefore, when only the connection portions are the second members, the number of second members is not limited to one, and the number of second members may be two or more.

Furthermore, the second member 30*b* may be a second member including the connection portion 33, part of the side wall portion 31, and part of the base portion 32, and an example of this will be simply described with reference to FIG. 7. Although the second member 30*b* shown in FIG. 7 includes only the connection portion 33 and part of the side wall portion 31, part of the base portion 32 of the point contacting the connection portion 33 may also be added to the second member 30*b*.

In this way, the present disclosure is not limited to the embodiment described above, and various changes can be made without departing from the scope of the present disclosure. This is apparent to those skilled in the art from the description of the claims.

What is claimed is:

1. A fan apparatus comprising: a stator unit; a rotor unit comprising an impeller; and a casing that houses the stator unit and the rotor unit, wherein
   the casing comprises:
   a side wall portion that surrounds a periphery of the impeller;
   a base portion that holds the stator unit and the rotor unit; and
   a plurality of connection portions that connect the side wall portion and the base portion,
   the casing is formed by at least two members including a first member and a second member coupled to the first member,
   the first member includes at least one of the connection portions and at least part of the base portion,
   the second member includes at least one of the connection portions that is other than the at least one of the connection portions included in the first member,
   the rotor unit includes an adjustment region,
   the first member includes an open region that is a location where the second member is to be provided, and
   the open region is the region where the adjustment region can be accessed in a state in which the rotor unit is held by the base portion and when the second member is not coupled to the first member,
   wherein balance adjustment can be performed in the adjustment region through the open region when the second member is not coupled to the first member.

2. The fan apparatus according to claim 1, wherein the second member further includes at least either part of the side wall portion or part of the base portion.

3. The fan apparatus according to claim 2, wherein the second member includes at least part of the side wall portion.

4. The fan apparatus according to claim 1, wherein the balance adjustment is performed by attaching a balance weight to the adjustment region.

5. The fan apparatus according to claim 4, wherein the rotor unit comprises:
   a shaft;
   the impeller comprising a hub portion attached to the shaft and a plurality of blades on a periphery of the hub portion;
   a yoke provided on an inner peripheral surface of the hub portion; and
   a magnet provided on the yoke,
   the hub portion has a cup shape opening toward the base portion, and
   the rotor unit includes, as the adjustment region, a recess portion for attaching the balance weight, the recess portion provided along an opening edge of the cup shape opening of the hub portion.

6. The fan apparatus according to claim 5, wherein an outer diameter of the opening edge portion of the hub portion is substantially the same as an outer diameter of an end portion of the base portion closer to the hub portion.

7. The fan apparatus according to claim 1, wherein the connection portion of the second member is provided with a support portion that supports lead wires on a side close to the impeller, the lead wires being drawn out from a circuit board provided on the base portion or a circuit board provided between the stator unit and the base portion.

8. The fan apparatus according to claim 7, wherein the side wall portion comprises a lead wire draw-out portion for drawing out the lead wires to outside of the casing, and
   the support portion is configured to guide the lead wires to the lead wire draw-out port.

9. The fan apparatus according to claim 7, wherein the base portion is provided with a lead wire removal portion for drawing out the lead wires toward the side wall portion, and
   the connection portion of the second member is the connection portion adjacent to the lead wire removal portion.

10. The fan apparatus according to claim 3, wherein the side wall portion comprises a lead wire draw-out port for drawing out lead wires to outside of the casing, the lead wires being drawn out from a circuit board provided on the base portion or a circuit board provided between the stator unit and the base portion, and
    the lead wire draw-out port is formed by coupling the first member and the second member.

11. The fan apparatus according to claim 10, wherein a coupling point of the first member and the second member comprises a coupling structure selected from a fitting structure in a stepped shape and an engaging structure engaged by an engaging hook.

12. The fan apparatus according to claim 11, wherein the second member is coupled to the first member in a direction intersecting a flow of gas generated by the impeller.

13. A manufacturing method of the fan apparatus according to claim 1 wherein
    when balance adjustment is necessary, the rotor unit is accessed from an open region provided with the second member to perform a balance adjustment of the rotor unit before the second member is coupled to the first member in a state in which the rotor unit and the stator unit are held by the base portion.

\* \* \* \* \*